June 28, 1960  N. K. LINDGREN  2,943,253
SPEED REGULATING DEVICE
Filed Feb. 19, 1959
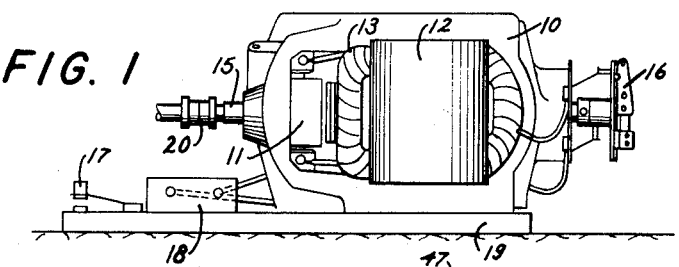
FIG. 1
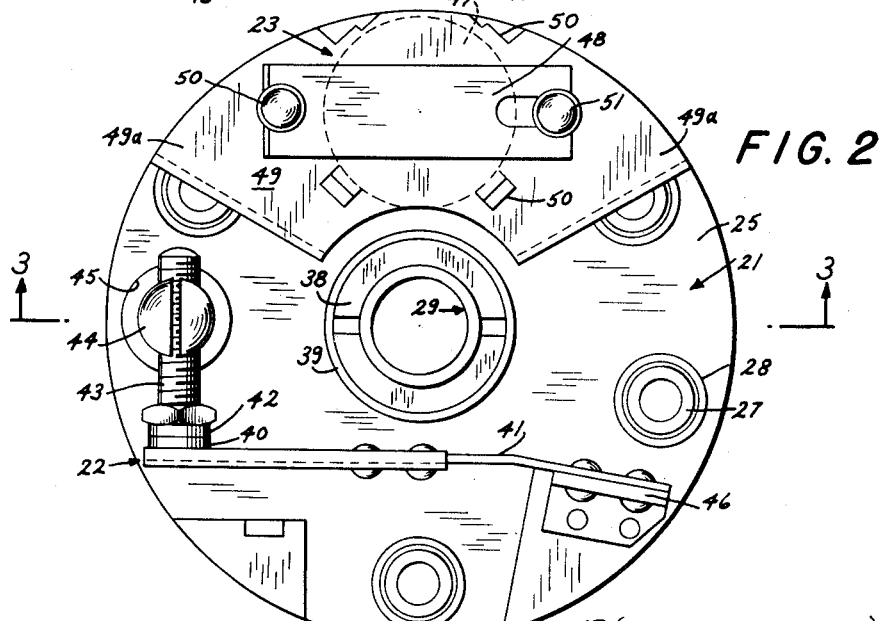
FIG. 2
FIG. 3
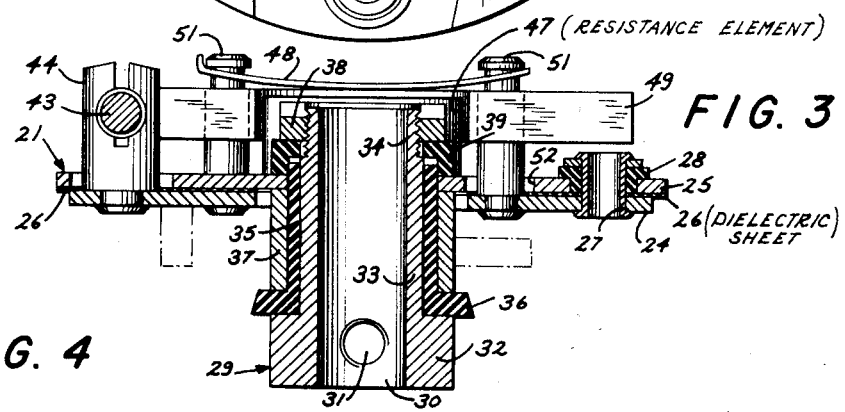
FIG. 4
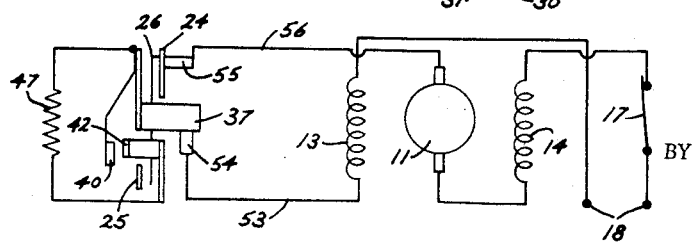
INVENTOR.
Nils Haurie Lindgren
BY
Edmund A. Fernandez
his ATTORNEY United States Patent Office 2,943,253
Patented June 28, 1960

2,943,253

SPEED REGULATING DEVICE

Nils Kauri Lindgren, Stockholm, Sweden, assignor to Aktiebolaget Electrolux, Stockholm, Sweden, a corporation of Sweden Filed Feb. 19, 1959, Ser. No. 794,319

Claims priority, application Sweden June 17, 1958

10 Claims. (Cl. 318—325)

This invention relates to regulators for rotary electrical machines and particularly to such devices employing a centrifugal switch and a capacitor.

To accomplish automatic speed regulation of small, high speed, electrical motors, for example, it is common practice to employ a resistance selectively included or excluded from the circuit of the motor windings automatically by means of a centrifugal switch responding to motor speed, a capacitor being employed to prevent the switch from causing radio and television interference. The switch is ordinarily mounted on a support carried by the motor shaft, and the capacitor is mounted on the same support. While such devices are successful in operation, a distinct disadvantage arises because inclusion of the capacitor on the support member makes it difficult to obtain a satisfactory balanced condition for the assembly.

An object of the present invention is to provide such a regulator wherein the capacitor constitutes the support upon which the centrifugal switch is mounted.

Another object is to provide a regulator of the type described which is so constructed as to assure substantially perfect dynamic balance in the regulator assembly as a whole.

A further object is to device a regulator of the type described wherein the capacitor employed is in the form of a flat element mounted on and disposed transversely of the motor shaft, and the centrifugal switch and resistance are in turn mounted directly on the capacitor in such disposition that the entire assembly is dynamically balanced.

Yet another object is to devise such a regulator wherein one of the conductive elements of the capacitor constitutes the moving member or slip ring engaged by one of the brushes employed to maintain proper electrical connections to the regulator during operation of the electrical machine.

A still further object of the invention is to provide a device of the type described wherein no wires are employed to connect the capacitor to the switch.

In order that the manner in which these and other objects are attained in accordance with the invention can be understood in detail, reference is had to the accompanying drawings, which form a part of this specification, and wherein:

Fig. 1 is a semi-diagrammatic side elevational view of an electrical motor equipped with a regulator constructed in accordance with one embodiment of the invention;

Fig. 2 is an end elevational view, larger in scale than Fig. 1, of the regulator employed in the device of Fig. 1;

Fig. 3 is an axial sectional view, with some parts shown in elevation, taken on line 3—3, Fig. 2, and Fig. 4 is a schematic diagram illustrating the electrical circuits for the motor and regulator in the device of Fig. 1.

Turning now to the drawings in detail, it will be seen that the device of Fig. 1 is a universal electrical motor comprising a housing 10 in which are mounted the usual armature 11 and stator 12, the stator being provided with electromagnetic winding 13 and the armature with electromagnetic winding 14, Fig. 4, in conventional fashion. The novel speed regulator of the invention is indicated generally at 16, being mounted directly on motor shaft 15. In addition, the motor is equipped with a manual start-stop switch 17, controlling current supplied to the windings via any suitable input connector 18. The motor is mounted on a suitable base 19 and connected to the driven device by means of a coupling 20 of insulating material.

As seen in Fig. 2, the regulator 16 includes a combination capacitor and mount 21, a centrifugal switch 22 and a resistance assembly 23.

The combined capacitor and mount 21 comprises a pair of flat, circular metal plates 24 and 25 disposed face-to-face and transversely of shaft 15, a thin sheet 26 of mica or other suitable dielectric material being disposed between the adjacent faces of the two plates, the two plates directly contacting the dielectric. The plates 24, 25 and the dielectric sheet 26 are held firmly together, as by hollow rivets 27 extending through aligned openings in members 24, 25, 26, one head portion of each rivet directly engaging plate 24 and the other head portion being electrically insulated from plate 25 by a flanged washer 28 of insulating material, as seen in Fig. 3. Thus, device 21 is a laminated capacitor of which plates 24, 25 are the plates.

The combined capacitor and mount 21 is secured to shaft 15 by mounting means including a hub member 29 having a bore 30 to accommodate the shaft and being locked to the shaft by any suitable means such as a set screw at 31, Fig. 3. Hub member 29 includes an outwardly directed shoulder portion 32, an intermediate portion 33 and an exteriorly threaded tip 34. Portion 33 is embraced by a bushing 35 of electrical insulating material, the bushing including an outwardly extending annular flange 36 seated against shoulder portion 32 of the hub. The main body of bushing 35 is embraced by a metal sleeve 37.

Plate 25 of capacitor and mount 21 has a circular central opening snugly embracing a portion of bushing 35 left exposed by sleeve 37. One face of plate 25 abuts the end of sleeve 37 opposite flange 36, and the plate 25 is secured in place on the hub by a nut 38 threaded on tip portion 34 of the hub and separated from plate 25 by a cupped, annular washer of electrical insulating material 39. As nut 38 is threaded into place, the plate 25 is clamped rigidly between washer 39 and the adjacent end of sleeve 37, and is electrically insulated from hub 29 by bushing 35 and washer 39. Good electrical contact is provided between plate 25 and sleeve 37, for a purpose hereinafter described.

Plate 24 also has a central opening, which opening is substantially larger than that of plate 25. Hence, plate 24 does not contact metal sleeve 37.

The centrifugal switch 22 includes a movable contact 40, Fig. 2, carried by a resilient arm 41, and a fixed contact 42 carried by a metal screw 43, the screw extending chordwise with respect to the circular periphery of plate 25. Screw 43 extends through a threaded opening in a metal stud or column 44 which is fixed to plate 24 and passes freely through an opening 45 in plate 25. Contact 42 is thus mounted on and electrically connected to plate 24 but is electrically insulated from plate 25. The position of contact 42 can be adjusted by turning screw 43 in stud 44. Resilient contact-carrying arm 41 is mounted on and electrically connected to plate 25 by a metal bracket 46, Fig. 2.

When the speed of shaft 15 is below a predetermined value, switch 22 is biased to its normally closed position by the action of resilient arm 41, the spring force prevailing over the centrifugal force arising because of shaft rotation. As the speed of shaft 15, and hence the speed of the motor, increases, the centrifugal force tending to open switch 22 also increases so that, at the proper time, the centrifugal force overcomes the spring force and contacts 40 and 42 are separated.

The resistance assembly 23 comprises a ceramic resistance element 47 having the configuration of a short cylinder, one circular face thereof being in contact with the exposed face of plate 25 of capacitor and mount 21. Resistance 47 is held firmly in place, and in good contact with plate 25, by the combination of a metal bow spring 48 and a combination hold down and cooling plate 49 of metal. Plate 49 rests against the circular face of resistance 47 opposite plate 25 and has dependent fins 50 which engage the cylindrical surface of the resistance to position the same. Plate 49 includes portions 49a, of substantial area, which extend laterally of the resistance element to afford good heat radiation capacity.

Both ends of spring 48 are slotted, each end being engaged under the head of a different one of two metal studs or columns 51. Spring 48 bows toward plate 49 and has sufficient normal curvature to cause the spring to be held under compression when the assembly is completed in the manner seen in Figs. 2 and 3. Each stud 51 is mounted on and connected electrically to capacitor plate 24. As seen in Fig. 3, the studs 51 extend through openings 52 spaced radially outward of the hub assembly, the openings 52 being of such size that studs 51 do not contact plate 25. Hence, considering the circular faces of resistance element 47 as being the terminals thereof, one terminal is connected to plate 24 via both studs 51, spring 48 and hold down and cooling plate 49, while the other terminal is in direct contact with plate 25. Accordingly, resistance element 47 is connected between plates 24 and 25 to provide the circuit seen diagrammatically in Fig. 4.

The two studs 51 extend through openings in plate 49, which openings closely fit the studs, so that plate 49 and resistance element 47 are prevented from shifting laterally with respect to shaft 15.

One terminal of winding 13 is connected, via conductor 53, Fig. 4, to a carbon brush 54 so mounted as to be maintained in contact with sleeve 37, Fig. 3. It will be understood that sleeve 37 rotates with shaft 15, and that a conductive path is provided via brush 54, sleeve 37 and plate 25, hence via either switch 22 (when the switch is closed) or resistance 47 to plate 24.

On its face opposite dielectric sheet 26, plate 24 has a freely exposed annular area concentric with the axis of shaft 15. Bearing against this area is a second carbon brush 55, mounted in any suitable fashion, brush 55 being connected via conductor 56 to one of the usual commutator brushes for the motor. It will thus be seen that, when switch 22 is in its normally closed position, and manual switch 17 is closed, a circuit is completed to windings 13, 14 via brush 54, sleeve 37, plate 25, switch 22, plate 24 and brush 55, resistance 47 being short circuited. When the speed of shaft 15 increases by an amount sufficient to cause centrifugal switch 22 to open, the circuit is then via brush 54, sleeve 37, plate 25, the stud 51 connected to plate 25, resistance 47, the stud 51 connected to plate 24, and brush 55. Hence, the resistance 47 is included in series with windings 13, 14 and the motor is slowed sufficiently to cause centrifugal switch 22 to close, again short circuiting resistance 47.

Since movable contact 40 of switch 22 is connected to plate 25 and fixed contact 42 is connected to plate 24, it will be understood that the capacitor constituted by plates 24, 25 and dielectric sheet 26 is connected electrically across the centrifugal switch and is therefore effective in the usual manner to prevent the switch from creating radio and television interference. In this regard, it is to be noted that the arrangement is such that no wires are employed to connect the capacitor across the switch.

Attainment of proper dynamic balance is made easier by the fact that the weight of all three elements constituting the capacitor is centered with respect to the axis of rotation of the regulator. It is accordingly only necessary to have switch 22 and resistance unit 23 balance each other dynamically.

The regulator illustrated is particularly useful in connection with small, high speed electrical motors of the type employed to drive calculating machines, cash registers, and the like, where speed regulation is important because the motor is intermittently loaded.

While one particularly advantageous embodiment of the invention has been shown for illustrative purposes, it is to be understood that various changes and modifications are possible without departing from the scope of the invention as defined by the appended claims.

I claim:

1. In a centrifugally actuated control device for a rotary electrical machine, the combination of a capacitor comprising two plates separated by a dielectric element and secured together to form a rigid, flat unit; mounting means secured to said capacitor and arranged to mount the capacitor on a rotary part of the electrical machine to be controlled with the flat capacitor extending transversely of the axis of rotation of such part; a centrifugal switch supported by said capacitor and comprising two contacts and two conductive supporting devices for said contacts, each of said contact supporting devices being mounted on and connected electrically to a different one of said two capacitor plates, each of said contact supporting devices being electrically insulated from the plate other than that on which it is mounted; and means operably associated with said capacitor plates to connect the same electrically to the circuit of the electrical machine to be controlled, said capacitor being connected across said switch by reason of said electrical connection of said supporting devices to said plates, said capacitor being electrically effective to at least minimize radio and television interference which would otherwise be caused by operation of said switch.

2. A control device in accordance with claim 1 and wherein one of said conductive supporting devices of said centrifugal switch comprises a resilient contact carrying arm extending generally parallel to the capacitor plate on which said one supporting device is mounted, said plate having an opening therethrough, and the other of said conductive supporting devices comprises a conductive element fixed to the other of said capacitor plates and extending through said opening.

3. A control device in accordance with claim 1 and wherein said mounting means comprises hub means including a conductive cylindrical surface, one of said capacitor plates being electrically connected to said surface, said means operably associated with said capacitor plates to connect the same electrically to the circuit of the electrical machine comprising a brush engaging said conductive cylindrical surface.

4. A control device in accordance with claim 3 and wherein said last-mentioned means includes a second brush engaging an exposed face of the one of said plates other than the plate connected to said conductive cylindrical surface.

5. In a centrifugally actuated control device, the combination of mounting means, a first metal plate secured to said mounting means, a second metal plate disposed parallel with respect to and secured to said first plate but electrically insulated therefrom, and a centrifugal switch comprising a first contact mounted on and connected electrically to said first plate but insulated from said second plate and a second contact mounted on and connected electrically to said second plate but insulated from said first plate, said plates constituting elements of a capacitor and said capacitor being connected electrically across said switch contacts by reason of the fact that said contacts are each mounted on and electrically connected to a different one of said plates, said capacitor being electrically effective to at least minimize radio and television interference which would otherwise result from operation of said switch.

6. In a centrifugally actuated control device, the combination of a hub assembly; a flat capacitor commprising a pair of metal plates insulated from each other by an intervening sheet of dielectric material, said plates being secured together to form a rigid unit, one of said plates having a central opening through which a portion of said hub assembly extends, said hub assembly including means clamping said one plate to said assembly in such position that said plates extend transversely of the axis of said hub assembly; and a centrifugal switch comprising a fixed contact, a fixed contact mounting member of conductive material, a movable contact, and conductive mounting means therefor, one of said capacitor plates having an opening spaced radially from said hub assembly and through which said fixed contact mounting member extends, said contacts being connected electrically each to a different one of said capacitor plates.

7. In a centrifugally actuated control device, the combination of a hub assembly comprising a hub body adapted to be fixed to a rotary shaft, an insulating bushing surrounding said body, and a cylindrical metal sleeve surrounding said bushing; a first metal plate having a central opening, said plate being disposed transversely of said hub assembly with said bushing extending through said central opening and with one end of said sleeve engaging a face of said plate, said hub assemmbly including means engaging said plate and clamping the same directly against said sleeve to secure said plate to the hub assembly and to maintain said plate and sleeve in electrical contact; a second metal plate extending parallel to said first plate, said first and second plates being secured rigidly together but electrically insulated from each other, said second plate having a central opening through which said hub assembly extends; and a centrifugal switch comprising two contacts, one of said contacts being mounted on and electrically connected to said first plate but insulated from said second plate, the other of said contacts being mounted on and connected electrically to said second plate but insulated from said first plate, said plates constituting elements of a capacitor connected electrically across said switch.

8. In a centrifugally actuated speed regulator for a rotary electrical motor, the combination of mounting means for mounting the regulator on a rotary part of the motor; a first metal plate secured to said mounting means and extending transversely with respect to the axis of rotation of such rotary part; a second metal plate extending parallel to said first plate and electrically insulated therefrom; means mechanically attaching said second plate to said first plate; a centrifugal switch comprising a first contact mounted on and electrically connected to said first plate but insulated from said second plate and a second contact mounted on and electrically connected to said second plate but insulated from said first plate, said plates constituting elements of a capacitor connected electrically across said switch; a resistance element; and means securing said resistance element to one of said plates, the terminals of said resistance element being connected each to a different one of said plates.

9. A motor speed regulator in accordance with claim 8 and in which said switch and resistance element are generally opposed across said mounting means.

10. A speed regulator in accordance with claim 8 and wherein said resistance element comprises opposed end faces, one of said faces being engaged with one of said plates and the other of said faces being engaged by conductive hold down means mounted on and electrically connected to the other of said plates, but insulated from said one plate.

References Cited in the file of this patent

UNITED STATES PATENTS 2,084,907    Groot _____ June 22, 1937